(12) United States Patent
Shimomura et al.

(10) Patent No.: US 10,109,311 B2
(45) Date of Patent: Oct. 23, 2018

(54) MOTOR INCLUDING BASE PORTION AND VENT PASSAGE AND DISK DRIVE APPARATUS PROVIDED WITH SAME

(71) Applicant: Nidec Corporation, Kyoto (JP)

(72) Inventors: Takumi Shimomura, Kyoto (JP); Shingo Suginobu, Kyoto (JP); Katsuya Takahashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/795,348

(22) Filed: Oct. 27, 2017

(65) Prior Publication Data

US 2018/0174610 A1   Jun. 21, 2018

(30) Foreign Application Priority Data

Dec. 16, 2016  (JP) ................................. 2016-244078

(51) Int. Cl.
| | | |
|---|---|---|
| G11B 19/20 | (2006.01) | |
| G11B 5/012 | (2006.01) | |
| G11B 33/14 | (2006.01) | |
| H02K 3/00 | (2006.01) | |
| H02K 5/22 | (2006.01) | |
| H02K 3/50 | (2006.01) | |

(52) U.S. Cl.
CPC .......... G11B 19/2036 (2013.01); G11B 5/012 (2013.01); G11B 19/2009 (2013.01); G11B 33/1446 (2013.01); G11B 33/1486 (2013.01); H02K 3/00 (2013.01); H02K 3/50 (2013.01); H02K 5/22 (2013.01); H02K 5/225 (2013.01); H02K 2205/09 (2013.01)

(58) Field of Classification Search
CPC .. G11B 19/2009; G11B 33/1446; H02K 3/00; H02K 5/22
USPC ........................ 360/98.07, 99.08; 310/71, 89
See application file for complete search history.

(56) References Cited

U.S. PATENT DOCUMENTS

| | | | |
|---|---|---|---|
| 5,705,868 A * | 1/1998 | Cox .................... | G11B 19/2009 310/40 MM |
| 6,429,555 B1 * | 8/2002 | Stefansky .......... | G11B 19/2009 310/71 |
| 7,012,191 B1 * | 3/2006 | Watanabe ............ | G11B 33/121 174/50 |
| 7,105,963 B2 * | 9/2006 | Ito .......................... | H02K 3/522 310/67 R |
| 7,812,489 B2 * | 10/2010 | Hino ...................... | H02K 3/522 174/262 |
| 8,278,791 B2 * | 10/2012 | Yamazaki .............. | H02K 3/522 310/71 |
| 8,964,329 B2 | 2/2015 | Taki et al. | |

(Continued)

*Primary Examiner* — Jefferson Evans
(74) *Attorney, Agent, or Firm* — Keating & Bennett, LLP (57) ABSTRACT

A stationary portion includes a stator unit including coils in an annular shape with a central axis as a center; a base portion below the stator unit; and a housing defining an interior space in which a rotating portion, a bearing portion, and the stator unit are accommodated. The base portion includes a through hole extending through the base portion in an axial direction to join an outside of the housing and the interior space to each other; a sheet covering an upper opening of the through hole to close the through hole; a filler covering a lower opening of the through hole; and a vent passage defined in at least one of the base portion and the sheet to join the through hole and the interior space to each other.

11 Claims, 8 Drawing Sheets

(56) References Cited

U.S. PATENT DOCUMENTS

| | | | |
|---|---|---|---|
| 9,166,452 B1* | 10/2015 | Endo | G11B 19/2009 |
| 9,369,019 B1* | 6/2016 | Abe | H02K 3/28 |
| 2001/0033061 A1* | 10/2001 | Hoffmann | G11B 19/2009 |
| | | | 277/627 |
| 2005/0206255 A1* | 9/2005 | Yoshino | H02K 3/522 |
| | | | 310/71 |
| 2012/0182645 A1* | 7/2012 | Kurokawa | G11B 19/2009 |
| | | | 360/99.08 |
| 2013/0031773 A1* | 2/2013 | Matsuyama | H02K 15/0062 |
| | | | 29/596 |
| 2014/0042844 A1* | 2/2014 | Sato | H02K 5/225 |
| | | | 310/71 |
| 2015/0036475 A1* | 2/2015 | Shiraishi | G11B 19/2036 |
| | | | 369/258.1 |

\* cited by examiner

MOTOR INCLUDING BASE PORTION AND VENT PASSAGE AND DISK DRIVE APPARATUS PROVIDED WITH SAME

CROSS REFERENCE TO RELATED APPLICATIONS

This application claims the benefit of priority to Japanese Patent Application No. 2016-244078 filed on Dec. 16, 2016. The entire contents of this application are hereby incorporated herein by reference.

BACKGROUND OF THE INVENTION

1. Field of the Invention

The present invention relates to a motor and a disk drive apparatus.

2. Description of the Related Art

A disk drive apparatus, such as, for example, a hard disk drive, has been known. A motor arranged to rotate a disk is typically installed in such a disk drive apparatus. A known disk drive apparatus is described in, for example, JP-A 2014-239597. The disk drive apparatus described in JP-A 2014-239597 includes a stationary portion arranged to support primary components of a motor. The stationary portion includes a base plate including base through holes defined therein. A lead wire extending from a coil is arranged to pass through each of the base through holes. Then, an adhesive is arranged between a wall of each base through hole and an entire circumferential extent of the lead wire which passes through the base through hole to achieve improved airtightness of the disk drive apparatus.

In the disk drive apparatus described in JP-A 2014-239597, each base through hole is provided with an auxiliary recessed portion used as an air escape and defined in a lower surface of the base plate in order to allow the adhesive to be more securely put into the base through hole. However, because the adhesive is put into each base through hole from below the lower surface of the base plate, the adhesive may flow into the auxiliary recessed portion, which in turn may prevent the adhesive from being securely put into the base through hole. A failure to securely put the adhesive into each base through hole might impair the airtightness of the disk drive apparatus. Therefore, there has been a need to carefully check the airtightness after the putting of the adhesive.

SUMMARY OF THE INVENTION

In view of the above problem, the present invention has been conceived to provide a motor and a disk drive apparatus with a structure which allows a filler to be easily put into a through hole.

A motor according to a preferred embodiment of the present invention includes a stationary portion; a rotating portion arranged to rotate about a central axis extending in a vertical direction; and a bearing portion arranged to support the rotating portion such that the rotating portion is rotatable with respect to the stationary portion. The stationary portion includes a stator unit including a plurality of coils arranged in an annular shape with the central axis as a center; a base portion arranged below the stator unit; and a housing arranged to define an interior space in which the rotating portion, the bearing portion, and the stator unit are accommodated. The base portion includes a through hole arranged to pass through the base portion in an axial direction to join an outside of the housing and the interior space to each other; a sheet arranged to cover an upper opening of the through hole to close the through hole; a filler arranged to cover a lower opening of the through hole; and a vent passage defined in at least one of the base portion and the sheet to join the through hole and the interior space to each other.

According to the above preferred embodiment of the present invention, when the filler, such as, for example, an adhesive, is put into the through hole from a lower side thereof, air in the through hole will escape into the interior space through the vent passage. This prevents the air in the through hole from inhibiting a flow of the filler into the through hole and from causing a failure to put the filler into the through hole.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, a first preferred embodiment of the present invention will be described with reference to the accompanying drawings. It is assumed herein that a direction parallel to a central axis of a motor is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a stator unit is arranged with respect to a base portion is defined as an upper side. The shape of each member or portion and relative positions of different members or portions will be described based on the above assumptions. It should be noted, however, that the above definitions of the vertical direction and the upper and lower sides are not meant to restrict in any way the orientation of a motor or a disk drive apparatus according to any preferred embodiment of the present invention when in use.

Also note that the term "parallel" as used herein includes both "parallel" and "substantially parallel". Also note that the term "perpendicular" as used herein includes both "perpendicular" and "substantially perpendicular".

1. Structure of Disk Drive Apparatus

Figure 1:
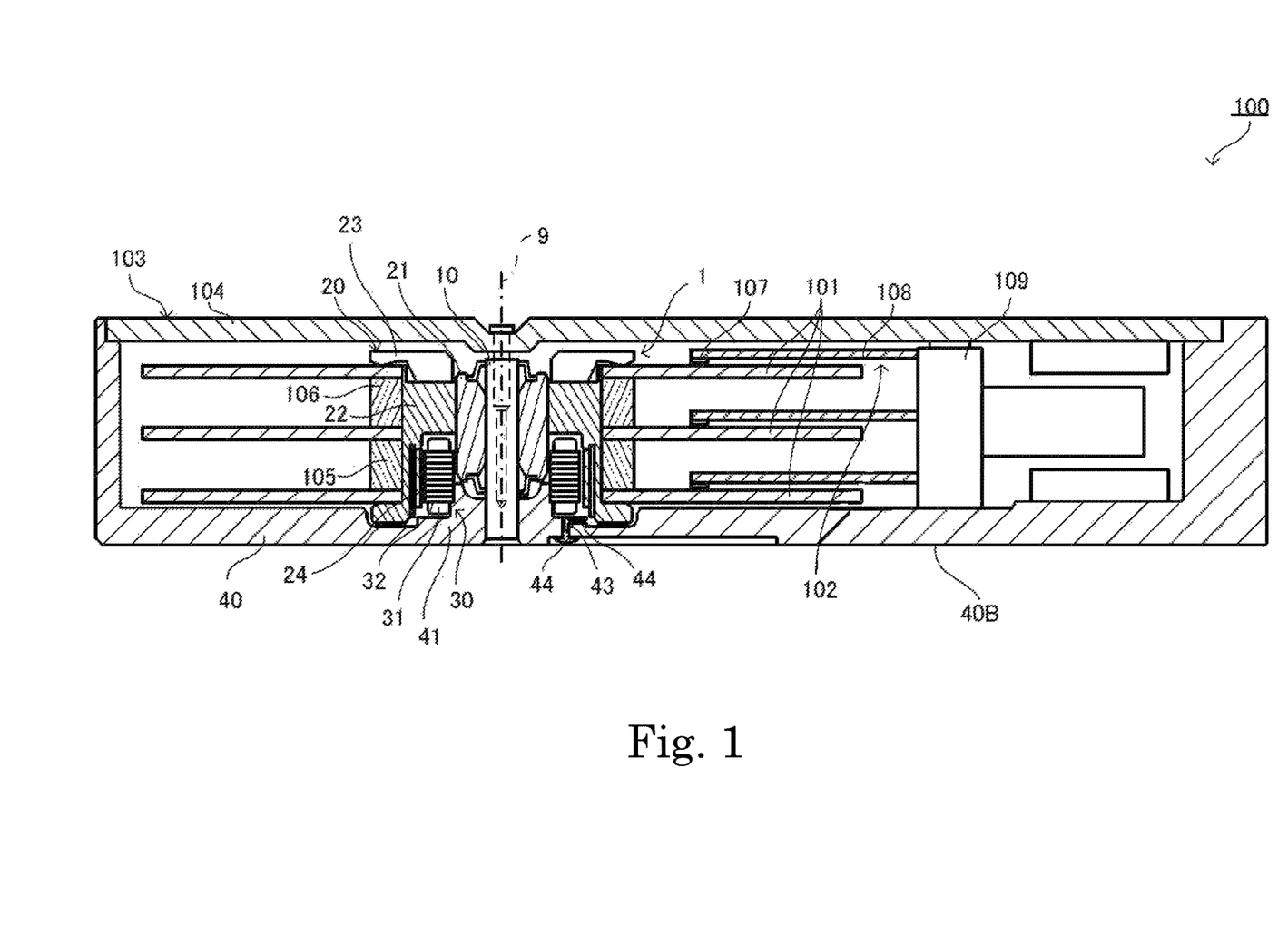
FIG. 1 is a sectional view of a disk drive apparatus according to a first preferred embodiment of the present invention.
Figure 2:
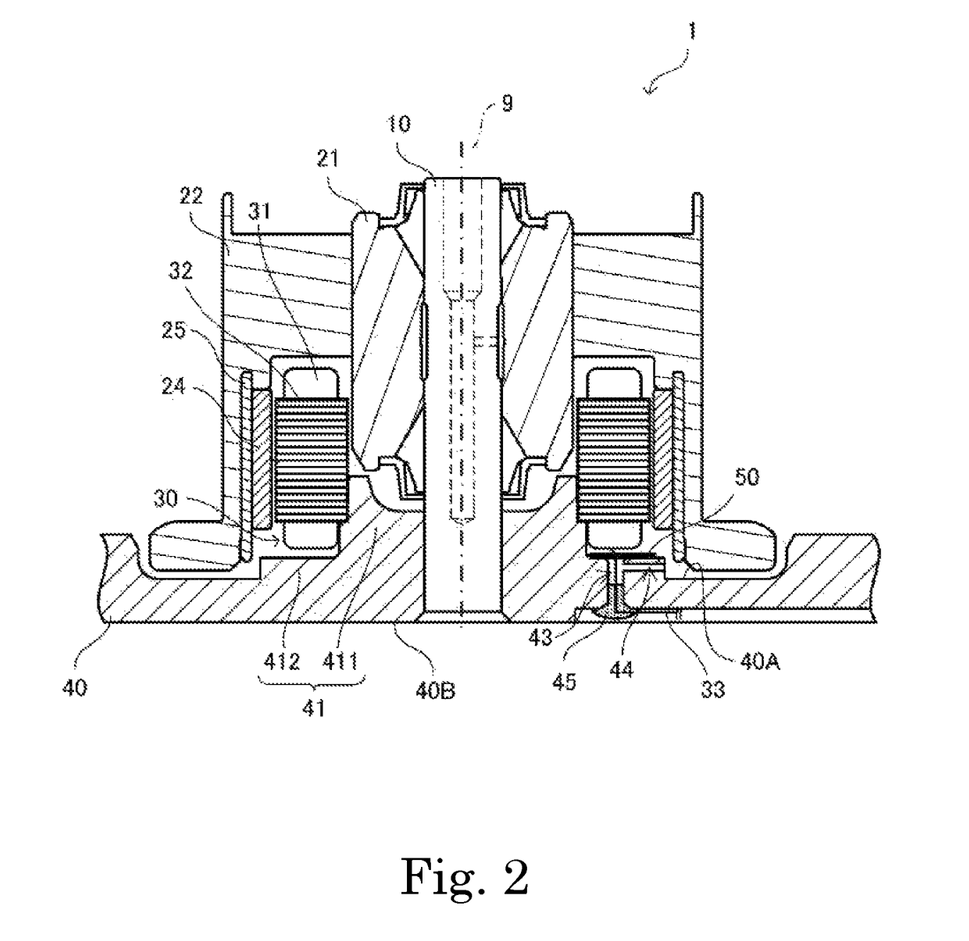
FIG. 2 is an enlarged view of a spindle motor of the disk drive apparatus illustrated in FIG. 1.

FIG. 1 is a sectional view of a disk drive apparatus 100 according to a first preferred embodiment of the present invention. FIG. 2 is an enlarged view of a spindle motor 1 of the disk drive apparatus 100 illustrated in FIG. 1.

The disk drive apparatus 100 is a hard disk drive. The disk drive apparatus 100 includes the spindle motor 1, a plurality of (three in FIG. 1) disks 101, an access portion 102, and a housing 103 arranged to accommodate the spindle motor 1, the disks 101, and the access portion 102.

The housing 103 includes a base portion 40 and a cover member 104. The base portion 40 defines a portion of the spindle motor 1, which will be described below. The base portion 40 includes an opening, and the cover member 104 is fitted in the opening to define the housing 103 together with the base portion 40. A shaft 10, a rotating portion 20, and a stator unit 30 of the spindle motor 1, which will be described below, are accommodated in an interior space of the housing 103. The base portion 40 and the cover member 104 are combined so as to maintain airtightness of the interior of the housing 103. The interior space of the housing 103 is filled with a gas having a density lower than that of air, e.g., a helium gas. Note that the interior space of the housing 103 may alternatively be filled with a hydrogen gas, air, or the like.

Each of the disks 101 is a medium on which information is recorded. The disks 101 are placed one above another along a central axis 9 extending in the vertical direction with a spacer 105 and a spacer 106 arranged between adjacent ones of the disks 101. Then, each of the disks 101 is supported by the spindle motor 1, which will be described in detail below. The disks 101 are caused by the spindle motor 1 to rotate about the central axis 9.

The access portion 102 includes a plurality of (three in FIG. 1) heads 107, a plurality of (three in FIG. 1) arms 108, and a head actuator mechanism 109. Each of the heads 107 is arranged in close proximity to a surface of a corresponding one of the disks 101 to magnetically perform at least one of reading of information recorded on the corresponding disk 101 and writing of information to the corresponding disk 101. Each head 107 is supported by an associated one of the arms 108. Each arm 108 is supported by the head actuator mechanism 109.

The spindle motor 1 includes the shaft 10, the rotating portion 20, the stator unit 30, and the base portion 40. The spindle motor 1 according to the present preferred embodiment is a three-phase motor. The stator unit 30, the base portion 40, and the housing 103, which includes the base portion 40, together define a "stationary portion" according to the present preferred embodiment.

The shaft 10 is a substantially columnar member arranged to extend along the central axis 9. The shaft 10 is arranged to support the rotating portion 20 such that the rotating portion 20 is capable of rotating about the central axis 9. The shaft 10 is made of, for example, a metal such as stainless steel or the like. An upper end portion of the shaft 10 is fixed to the cover member 104 of the housing 103. A lower end portion of the shaft 10 is fixed to the base portion 40.

The rotating portion 20 includes a sleeve 21, a rotor hub 22, a clamp member 23, a rotor magnet 24, and a yoke 25.

The sleeve 21 is supported to be rotatable about the central axis 9. The sleeve 21 is arranged opposite to the shaft 10 with a gap therebetween around the shaft 10. A fluid such as, for example, a lubricating oil or a gas is arranged in this gap. In the present preferred embodiment, an outer circumferential surface of the shaft 10, an inner circumferential surface of the sleeve 21, and the fluid arranged therebetween together define a bearing portion.

The rotor hub 22 is cylindrical. The rotor hub 22 is supported by the sleeve 21. In addition, the rotor hub 22 is arranged to rotate about the central axis 9 together with the sleeve 21. The sleeve 21 and the rotor hub 22 may be defined either by a single continuous monolithic member or by separate members. A metal such as, for example, an aluminum alloy or ferromagnetic stainless steel is used as a material of each of the sleeve 21 and the rotor hub 22.

The clamp member 23 is supported by the rotor hub 22. The clamp member 23 is arranged to support the disks 101 between the rotor hub 22 and the clamp member 23. The disks 101 are thus arranged to rotate about the central axis 9 while being supported by the rotating portion 20.

The rotor magnet 24 is fixed to an inner circumferential surface of the rotor hub 22 with the yoke 25 therebetween. The rotor magnet 24 is in the shape of a circular ring, and is centered on the central axis 9. An inner circumferential surface of the rotor magnet 24 is a pole surface in which north and south poles alternate with each other in a circumferential direction.

The stator unit 30 is arranged radially inside of the rotor hub 22 and opposite to the rotor magnet 24 with a gap therebetween. The stator unit 30 is arranged to generate a torque to rotate the rotating portion 20. The stator unit 30 includes a plurality of coils 31 and a stator core 32. The stator core 32 is a laminated structure defined by laminated magnetic bodies each of which is in the shape of a circular ring and is centered on the central axis 9, and is fixed to the base portion 40. The stator core 32 includes a plurality of teeth arranged to project radially outward. The coils 31 are wound around the teeth, and are arranged in an annular shape with the central axis 9 as a center. The coils 31 are made up of three coil groups. The three coil groups are a coil group for a U phase, a coil group for a V phase, and a coil group for a W phase. Each coil group is defined by one conducting wire.

The base portion 40 is, for example, molded by casting. The base portion 40 is an aluminum die-casting. The base portion 40 includes an upper surface 40A and a lower surface 40B. The upper surface 40A is a surface facing the interior of the housing 103. The lower surface 40B is a surface facing an outside of the housing 103.

Figure 3:
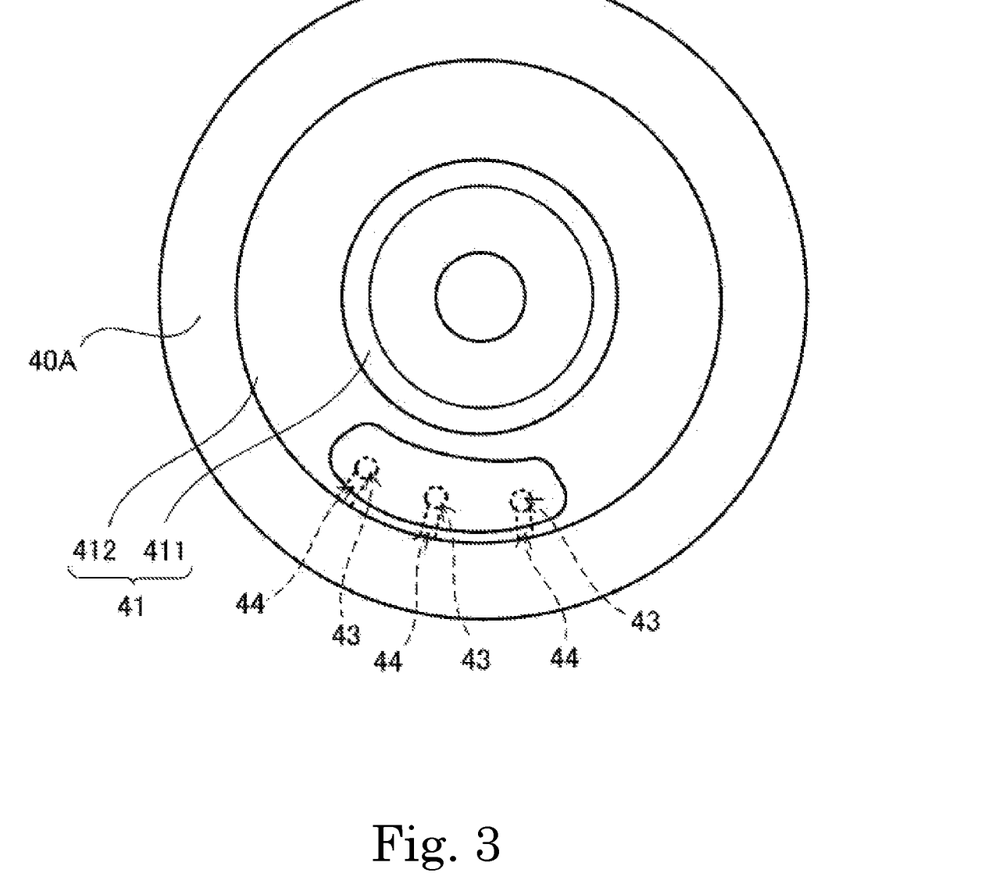
FIG. 3 is a plan view of a base portion according to the first preferred embodiment as viewed from above an upper surface of the base portion.

FIG. 3 is a plan view of the base portion 40 as viewed from above the upper surface 40A. The base portion 40 will be described below with reference to FIGS. 1 to 3.

The base portion 40 includes a projecting portion 41 arranged to project upward from the upper surface 40A. The projecting portion 41 includes a first projecting portion 411 and a second projecting portion 412. The first projecting portion 411 is arranged to fix the shaft 10 at the outer circumferential surface of the shaft 10. In addition, the first projecting portion 411 is arranged to support the stator core 32 of the stator unit with an outer circumferential surface thereof. The second projecting portion 412 is arranged on the outer circumferential surface of the first projecting portion 411. The second projecting portion 412 is arranged to have a vertical height lower than that of the first projecting portion 411. The stator unit 30, which is supported by the first projecting portion 411, is arranged above the second projecting portion 412.

The second projecting portion 412 includes three through holes 43 each of which is arranged to extend in the vertical direction. Each through hole 43 is arranged to bring the interior space of the housing 103 into communication with the outside of the housing 103. As illustrated in FIG. 3, the three through holes 43 are arranged along the circumferential direction. Lead wires 33 of the coils 31 are passed through the through holes 43. The coils 31 have three lead wires 33, each of which is arranged to supply a separate one of three-phase alternating currents. One of the three lead wires 33 is passed through each of the three through holes 43. Each lead wire 33 passes through the corresponding through hole 43, and is connected to a circuit board (not shown) arranged on the lower surface 40B of the base portion 40.

Each through hole 43 preferably has a larger length. An increased length of the through hole 43 increases a distance between the interior space of the housing 103 and the outside of the housing 103, thus improving the airtightness of the interior space of the housing 103. Accordingly, the second projecting portion 412 is arranged at the upper surface 40A of the base portion 40, and the through holes 43 are defined in the second projecting portion 412. This contributes to increasing the vertical length of each through hole 43.

The second projecting portion 412 includes vent passages 44 each of which is arranged to extend from a separate one of the through holes 43 to an outer circumferential surface of the second projecting portion 412. Each vent passage 44 is defined by a through hole defined in the second projecting portion 412 and extending in a direction perpendicular to the corresponding through hole 43. The vent passage 44 is arranged to bring the interior space of the housing 103 into communication with an inside of the corresponding through hole 43. As illustrated in FIG. 3, the vent passage 44 is provided for each of the three through holes 43.

An insulation sheet 50 is arranged on an upper surface of the second projecting portion 412. The upper surface of the second projecting portion 412 is a surface opposite to the stator unit 30 in the vertical direction. The insulation sheet 50 is arranged to cover an upper opening of each through hole 43 to close the through hole 43. The insulation sheet 50 includes holes (not shown) each of which is defined at a position substantially corresponding with a center portion of the opening of a separate one of the through holes 43. Each lead wire 33 is arranged to pass through the corresponding through hole 43 through a corresponding one of these holes, and is drawn out to the lower surface 40B of the base portion 40. The insulation sheet 50 is made of an insulating material, and is arranged to position each lead wire 33 with respect to the corresponding through hole 43 to prevent a contact between the lead wire 33 and an inner wall of the corresponding through hole 43.

The insulation sheet 50 is arranged to have a sufficient size to cover at least the openings of the three through holes 43. Note, however, that each of the three through holes 43 may alternatively be covered with a separate insulation sheet 50.

An adhesive 45, which serves as a filler, is put into each through hole 43. The adhesive 45 is an insulating adhesive. Each through hole 43 is closed by the adhesive 45, so that the interior space of the housing 103 is hermetically enclosed. The adhesive 45 is put into each through hole 43 from below the lower surface 40B of the base portion 40. In more detail, with the corresponding lead wire 33 drawn out through the through hole 43, the adhesive in a liquid state is put into the through hole 43 from below the lower surface 40B of the base portion 40, and the adhesive is hardened. Therefore, at least a lower opening of the through hole 43 is covered with the adhesive 45. In addition, at least a portion of the adhesive 45 is arranged in the through hole 43.

When the adhesive in the liquid state is put into each through hole 43, air in the through hole 43 is pushed upward by the adhesive being put thereinto from below. However, the upper side of the through hole 43 is sealed with the insulation sheet 50. Therefore, without the vent passage 44, the air in the through hole 43 would not be able to escape to any place. Then, air pressure by the air having no place to escape to might cause a failure in the putting of the adhesive into the through hole 43. Here, the interior space of the housing 103 is to be filled with the gas having a density lower than that of air, and this gas having a low density tends to easily leak even through a minute gap. Therefore, the failure in the putting of the adhesive into the through hole 43 might permit the low-density gas in the interior space of the housing 103 to leak through the through hole 43.

Accordingly, the vent passages 44 are provided in the present preferred embodiment. When the adhesive in the liquid state is put into each through hole 43, the air in the through hole 43 passes through the corresponding vent passage 44, and is discharged into the interior space of the housing 103. This contributes to preventing the aforementioned failure in the putting of the adhesive into the through hole 43. Notice that the interior space of the housing 103 is filled with the helium gas after the adhesive 45 is put into each through hole 43. This contributes to preventing the helium gas in the interior space of the housing 103 from leaking out of the housing 103 through any through hole 43.

Provision of the vent passages 44 makes it easier to put the adhesive 45 into each through hole 43. In addition, each vent passage 44 is defined in the second projecting portion 412. Thus, a greater length of each through hole 43 can be achieved than in the case where the through holes 43 are defined in the base portion 40 without the second projecting portion 412 being arranged at the upper surface 40A of the base portion 40. Thus, the likelihood that the helium gas in the interior space of the housing 103 will leak out of the housing 103 through any through hole 43 can be further reduced.

Note, however, that each through hole 43 may alternatively be defined in the base portion 40 without the second projecting portion 412 being arranged at the upper surface 40A of the base portion 40. That is, the length of the through hole 43 may alternatively be smaller than that of each through hole 43 according to the present preferred embodiment. Also note that each vent passage 44 may not necessary extend in a straight line in a radial direction as long as the vent passage 44 brings the inside of the corresponding through hole 43 into communication with the interior space of the housing 103. For example, the vent passage 44 may alternatively be angled with respect to a horizontal plane. Also note that, although the adhesive 45 is put into each through hole 43 up to approximately a vertical middle of the through hole 43 in FIG. 2, the adhesive 45 may be put into the through hole 43 in any desirable amount as long as the interior space of the housing 103 is hermetically enclosed.

2. Other Preferred Embodiments

While the first preferred embodiment of the present invention has been described above, it is to be understood that the present invention is not limited to the above-described preferred embodiment. Other preferred embodiments of the present invention, each of which is substantially similar to the above-described first preferred embodiment except that the structure of the vent passages 44 is modified, will now be described below.

2-1. Second Preferred Embodiment

In a second preferred embodiment of the present invention, the length of each of vent passages 44 is smaller than in the above-described preferred embodiment.

Figure 4:
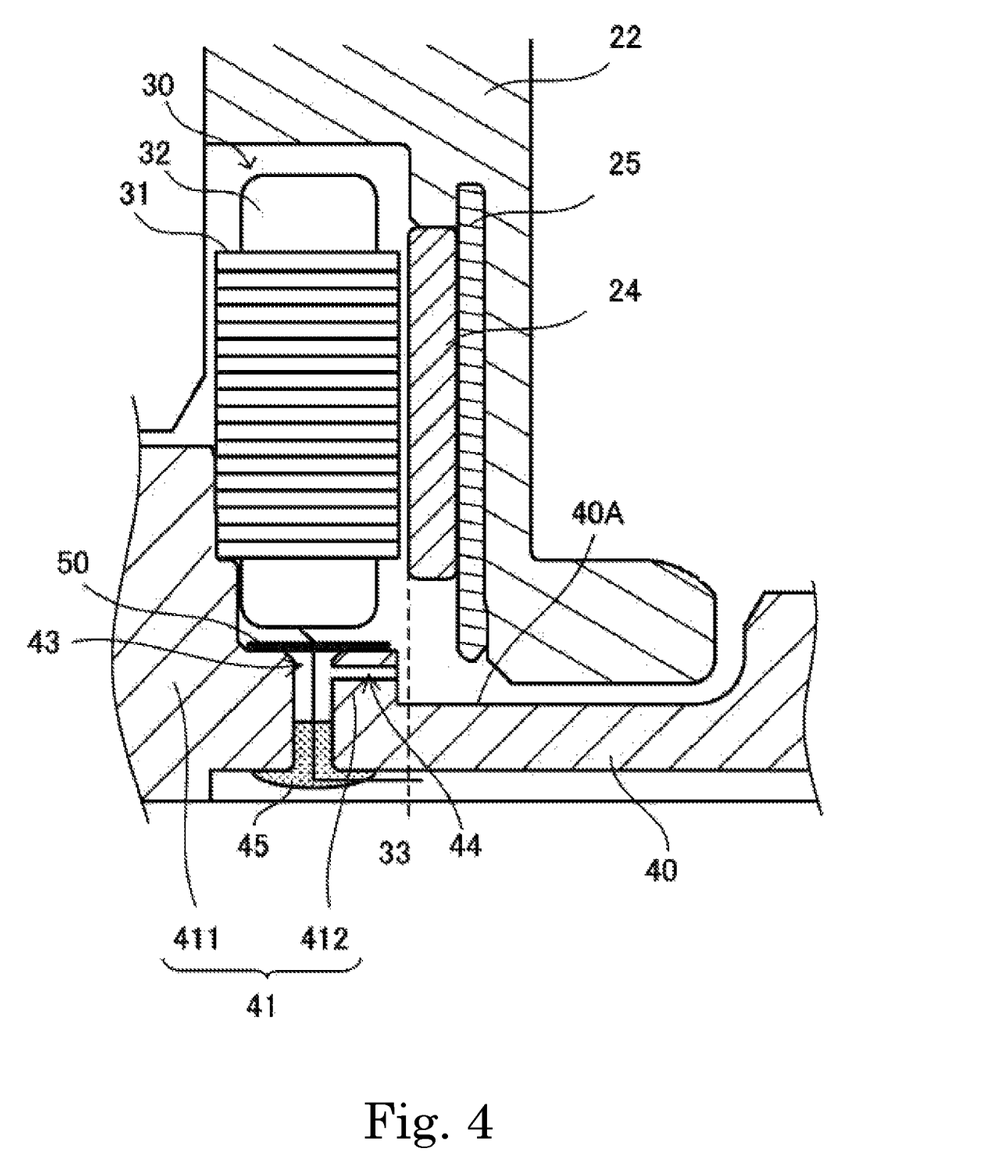
FIG. 4 is a diagram illustrating a portion of a spindle motor according to a second preferred embodiment of the present invention in an enlarged form.

FIG. 4 is a diagram illustrating a portion of a spindle motor 1 according to the second preferred embodiment of the present invention in an enlarged form. In the second preferred embodiment, a second projecting portion 412 is arranged radially inward of a radially inner surface of a rotor magnet 24. In other words, the second projecting portion 412 does not overlap with the rotor magnet 24 when viewed in the vertical direction. Accordingly, a distance from each of through holes 43 to an outer circumferential surface of the second projecting portion 412 is shorter than in the above-described preferred embodiment. That is, the length of each vent passage 44 is smaller than in the first preferred embodiment.

A reduced length of the vent passage 44 results in reduced passage resistance in the vent passage 44. This allows air in the corresponding through hole 43 to be more easily discharged to an interior space of a housing 103 through the vent passage 44 when an adhesive 45 is put into the corresponding through hole 43.

2-2. Third Preferred Embodiment

A third preferred embodiment of the present invention is different from each of the above-described preferred embodiments in that each of vent passages 44 is defined in an insulation sheet 50.

Figure 5:
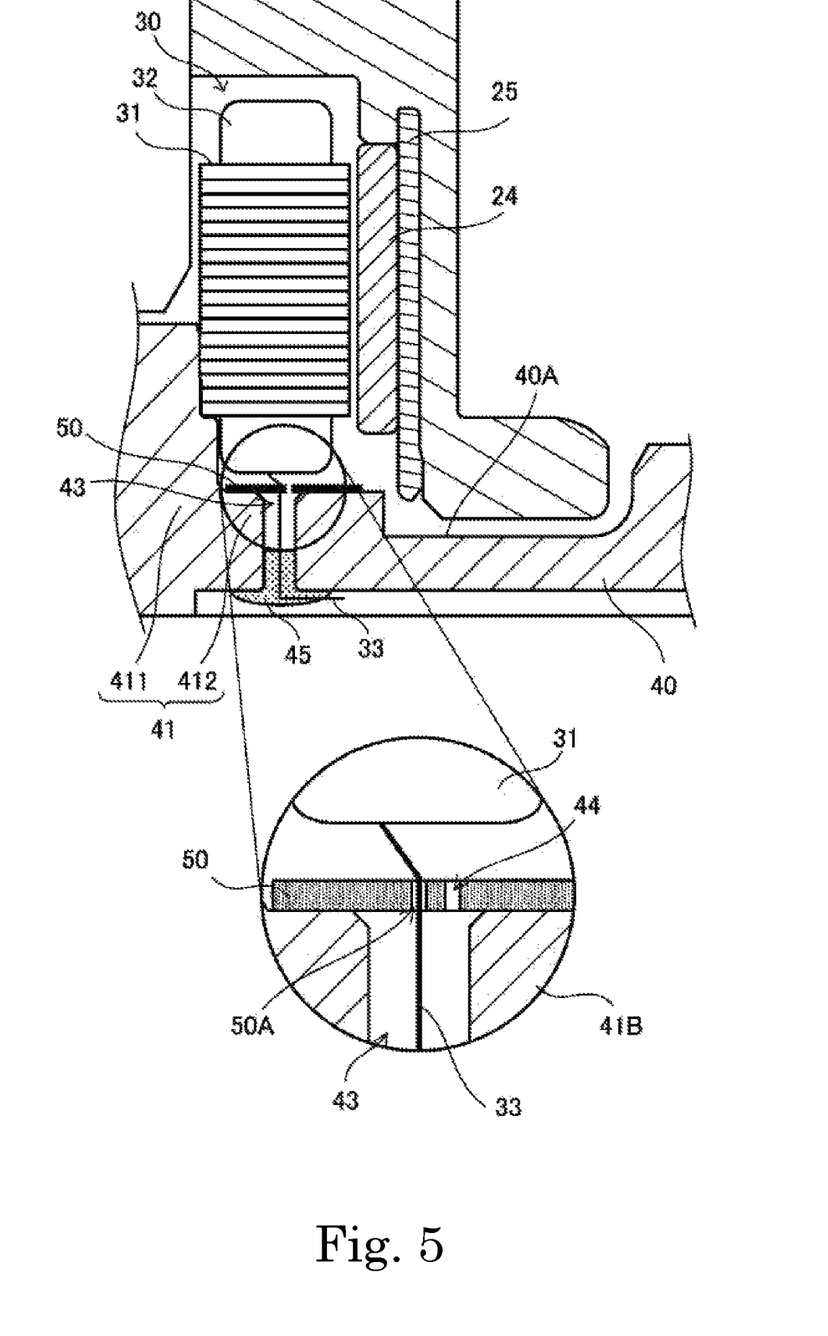
FIG. 5 is a diagram illustrating a portion of a spindle motor according to a third preferred embodiment of the present invention in an enlarged form.

FIG. 5 is a diagram illustrating a portion of a spindle motor 1 according to the third preferred embodiment of the present invention in an enlarged form. The insulation sheet 50 includes lead wire through holes 50A and the vent passages 44. Each lead wire through hole 50A is defined at a position substantially corresponding with a center portion of an opening of a corresponding one of through holes 43, and is arranged to extend in the vertical direction. A lead wire 33 is passed through each lead wire through hole 50A, and is drawn out to a lower surface 40B of a base portion 40 through the corresponding through hole 43. Each vent passage 44 is defined in the insulation sheet 50 in parallel with the corresponding lead wire through hole 50A. When an adhesive 45 is put into each through hole 43, air in the through hole 43 is discharged to an interior space of a housing 103 through the corresponding vent passage 44.

Provision of the vent passages 44 in the insulation sheet 50 eliminates the need to subject the base portion 40 to a process for defining the vent passages 44 in the base portion 40, and makes it possible to provide even an existing housing with the vent passages.

Note that each lead wire through hole 50A and the corresponding vent passage 44 may be either independent of each other or connected to each other.

2-3. Fourth Preferred Embodiment

A fourth preferred embodiment of the present invention is different from each of the above-described preferred embodiments in that each of vent passages 44 is defined by a recessed portion defined in at least one of a second projecting portion 412 and an insulation sheet 50 where the second projecting portion 412 and the insulation sheet 50 are in contact with each other.

Figure 6:
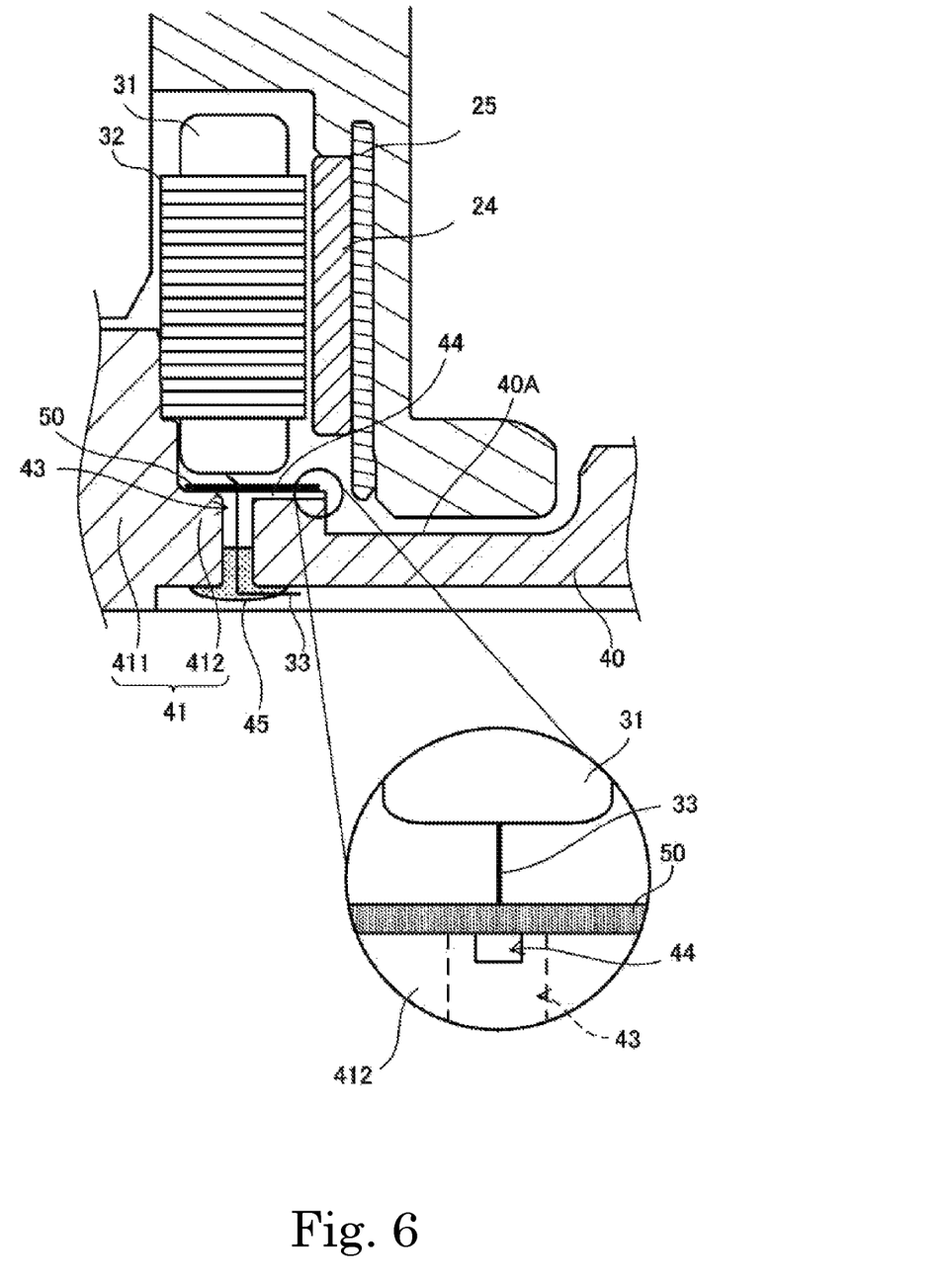
FIG. 6 is a diagram illustrating a portion of a spindle motor according to a fourth preferred embodiment of the present invention in an enlarged form in the case where each of vent passages is defined in a second projecting portion.

FIG. 6 is a diagram illustrating a portion of a spindle motor 1 according to the fourth preferred embodiment of the present invention in an enlarged form in the case where each vent passage 44 is defined in the second projecting portion 412. In FIG. 6, a diagram in a circle represents a portion of the spindle motor 1 which is enclosed by a circle as viewed from radially outside.

Each vent passage 44 is defined by a recessed portion defined in an upper surface of the second projecting portion 412. This recessed portion is arranged to extend in a radial direction from a corresponding one of through holes 43 to an outer circumferential surface of the second projecting portion 412. The insulation sheet 50 is arranged to cover an opening of each through hole 43 and at least a portion of the recessed portion. Thus, each vent passage 44 is arranged to bring an interior space of a housing 103 into communication with an inside of the corresponding through hole 43. In this case, the second projecting portion 412 can be worked more easily than in each of the above-described first and second preferred embodiments, in which each vent passage 44 is defined by a through hole.

Figure 7:
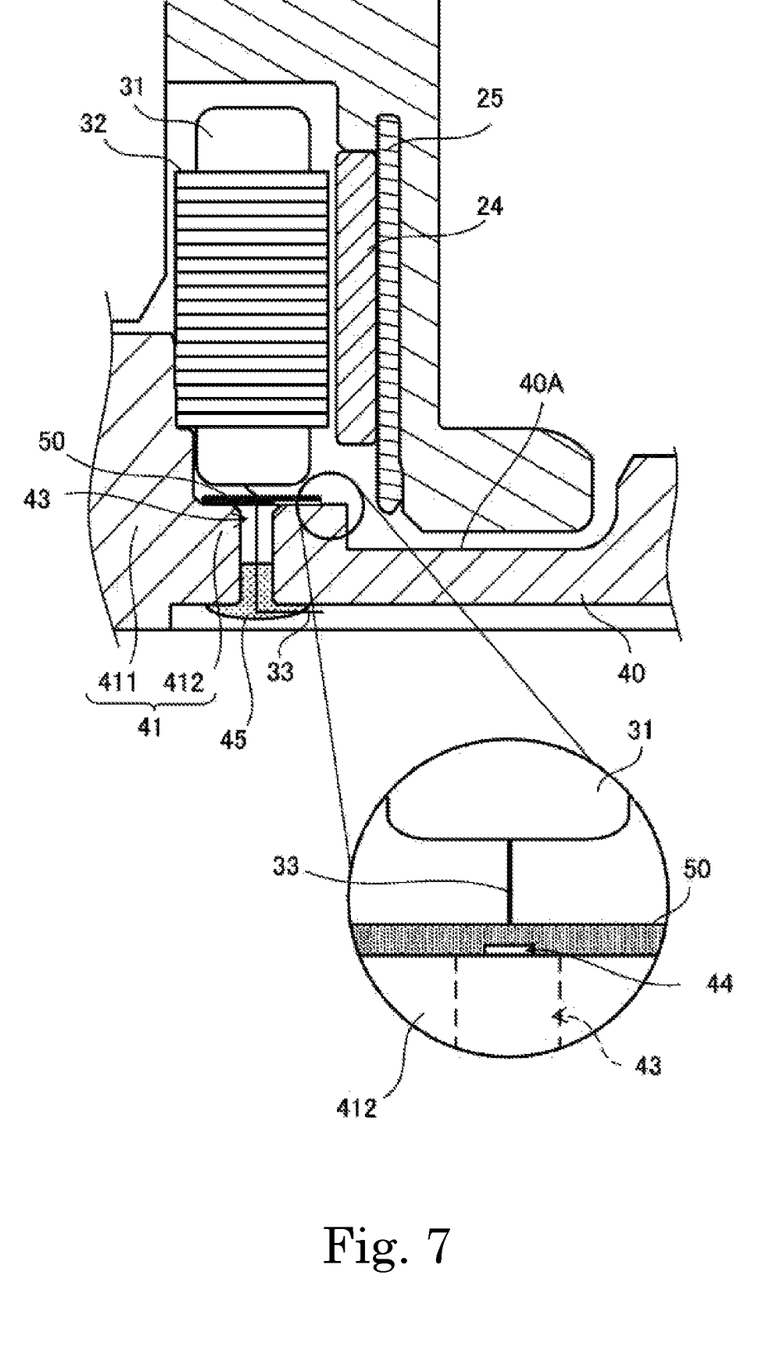
FIG. 7 is a diagram illustrating a portion of a spindle motor according to the fourth preferred embodiment of the present invention in an enlarged form in the case where each of vent passages is defined in an insulation sheet.

FIG. 7 is a diagram illustrating a portion of a spindle motor 1 according to the fourth preferred embodiment of the present invention in an enlarged form in the case where each vent passage 44 is defined in the insulation sheet 50. In FIG. 7, a diagram in a circle represents a portion of the spindle motor 1 which is enclosed by a circle as viewed from radially outside.

Each vent passage 44 is defined by a recessed portion defined in a lower surface of the insulation sheet 50. The lower surface of the insulation sheet 50 is a surface which is in contact with an upper surface of the second projecting portion 412. The recessed portion is arranged to extend in a radial direction from a position which will overlap with an opening of a corresponding one of through holes 43 when the insulation sheet 50 is arranged on the upper surface of the second projecting portion 412 to an end portion of the insulation sheet 50. Thus, each vent passage 44 is arranged to bring an interior space of a housing 103 into communication with an inside of the corresponding through hole 43. In this case, an additional process does not need to be performed on a base portion 40, and therefore, an existing spindle motor can be easily provided with the vent passages.

Note that, in the case where the vent passages 44 are defined in the insulation sheet 50, each vent passage 44 may be bored in the insulation sheet 50, or alternatively, a laminated structure of the insulation sheet 50 may be employed to define the vent passages 44.

Figure 8:
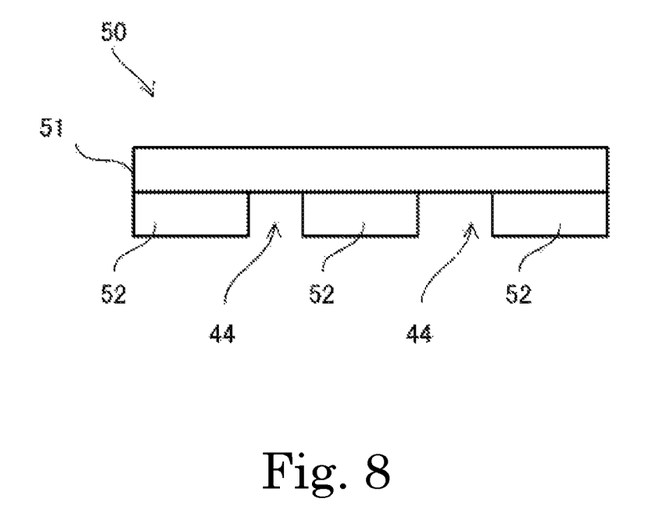
FIG. 8 is a diagram illustrating the case where a laminated structure of an insulation sheet is employed to define vent passages according to a preferred embodiment of the present invention.

FIG. 8 is a diagram illustrating the case where the laminated structure of the insulation sheet 50 is employed to define the vent passages 44. The insulation sheet 50 is made up of a base 51 and adhesive layers 52 placed on the base 51.

The insulation sheet 50 is arranged on the upper surface of the second projecting portion 412 with the adhesive layers 52 facing the second projecting portion 412. The insulation sheet 50 is adhered to the second projecting portion 412 through the adhesive layers 52. Areas where the adhesive layers 52 are not placed on the base 51 are recessed toward an interior of the housing 103 relative to areas where the adhesive layers 52 are placed on the base 51. These recessed portions can be used as the vent passages 44. That is, the vent passages 44 can be defined in the insulation sheet 50 by not placing any adhesive layer 52 on the base 51 in areas where the vent passages 44 are to be defined.

Note that each vent passage 44 may alternatively be defined by both a recessed portion defined in the second projecting portion 412 and a recessed portion defined in the insulation sheet 50. In this case, the two recessed portions may or may not overlap with each other when viewed in the vertical direction.

Also note that a vent passage 44 arranged to extend in the circumferential direction may alternatively be provided.

Figure 9:
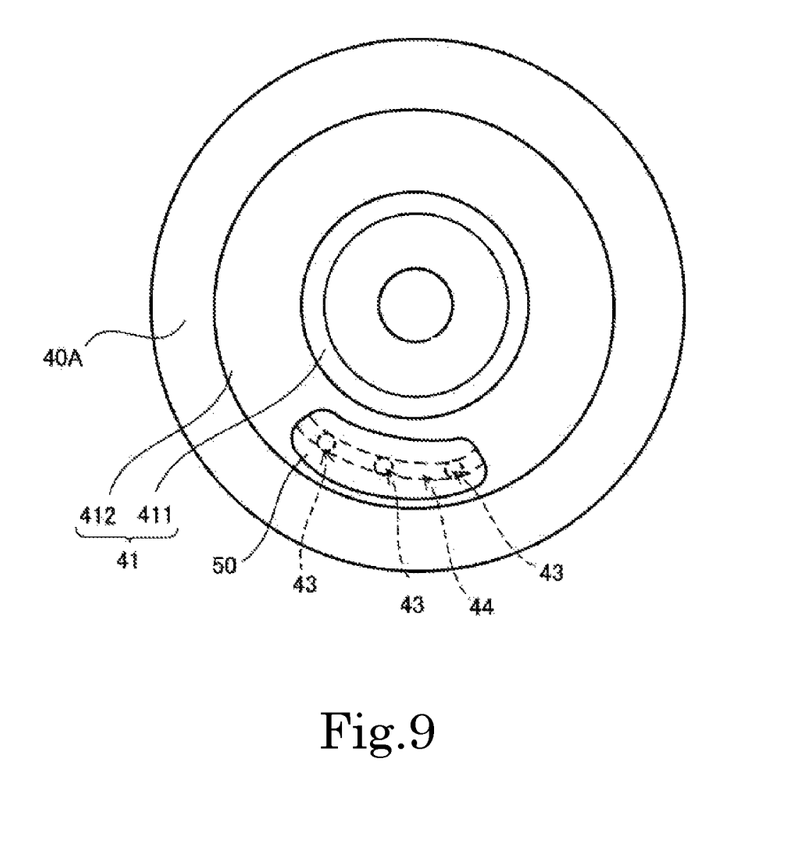
FIG. 9 is a plan view of a base portion according to a preferred embodiment of the present invention as viewed from above an upper surface of the base portion in the case where a vent passage arranged to extend in a circumferential direction is provided.

FIG. 9 is a plan view of a base portion 40 as viewed from above an upper surface 40A thereof in the case where the vent passage 44 arranged to extend in the circumferential direction is provided. In the case where the vent passage 44 arranged to extend in the circumferential direction is provided, the vent passage 44 is arranged to pass through openings of three through holes 43 as illustrated in FIG. 9. That is, the vent passage 44 is arranged to bring an inside of each of the three through holes 43 into communication with an interior space of a housing 103. In this case, an insulation sheet 50 can be worked more easily than in the case where a plurality of independent vent passages 44 are provided.

Note that, in the configuration of FIG. 9, the vent passage 44 may be defined either in a second projecting portion 412 or in the insulation sheet 50, or may alternatively be defined in both the second projecting portion 412 and the insulation sheet 50.

While the second, third, and fourth preferred embodiments of the present invention have been described above, it should be noted that features of the above-described preferred embodiments may be combined appropriately as long as no conflict arises.

Preferred embodiments of the present invention are applicable to, for example, spindle motors and disk drive apparatuses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
a stationary portion;
a rotating portion arranged to rotate about a central axis extending in a vertical direction; and
a bearing portion arranged to support the rotating portion such that the rotating portion is rotatable with respect to the stationary portion; wherein
the stationary portion includes:
a stator unit including a plurality of coils arranged in an annular shape with the central axis as a center;
a base portion arranged below the stator unit; and
a housing arranged to define an interior space in which the rotating portion, the bearing portion, and the stator unit are accommodated; and
the base portion includes:
a through hole arranged to pass through the base portion in an axial direction to join an outside of the housing and the interior space to each other;
a sheet arranged to cover an upper opening of the through hole to close the through hole;
a filler arranged to cover a lower opening of the through hole; and
a vent passage defined in at least one of the base portion and the sheet to join the through hole and the interior space to each other.

2. The motor according to claim 1, wherein at least a portion of the filler is arranged in the through hole.

3. The motor according to claim 1, wherein
the base portion includes a projecting portion arranged to project upward from an upper surface thereof;
each of the through hole and the vent passage is defined in the projecting portion; and
the vent passage is arranged to extend in a direction perpendicular to the through hole.

4. The motor according to claim 3, wherein
the rotating portion includes a magnet arranged radially outward of the stator unit; and
the projecting portion is arranged radially inward of a radially inner surface of the magnet.

5. The motor according to claim 1, wherein
the coils are provided with a lead wire drawn out from above an upper surface of the base portion to a lower surface of the base portion through the through hole;
the sheet is made of an insulating material, and includes a hole through which the lead wire is arranged to pass; and
the vent passage is defined by a hole defined in the sheet and connected to or independent of the hole.

6. The motor according to claim 1, wherein the vent passage is defined by a recessed portion defined in at least one of the sheet and the base portion where the sheet and the base portion are in contact with each other.

7. The motor according to claim 6, wherein the recessed portion is arranged to extend in a radial direction.

8. The motor according to claim 6, wherein the recessed portion is arranged to extend in a circumferential direction.

9. The motor according to claim 6, wherein
the recessed portion is defined in the sheet;
the sheet includes a base and an adhesive layer arranged to adhere the base to the base portion; and
the adhesive layer is absent where the recessed portion is defined.

10. A disk drive apparatus comprising:
the motor of claim 1;
a disk supported by the rotating portion in the interior space of the housing; and
an access portion arranged to perform at least one of reading and writing of information from or to the disk.

11. The disk drive apparatus according to claim 10, wherein the interior space of the housing is filled with a gas having a density lower than that of air.

* * * * *